United States Patent
Edgar et al.

(10) Patent No.: US 6,590,679 B1
(45) Date of Patent: Jul. 8, 2003

(54) MULTILINEAR ARRAY SENSOR WITH AN INFRARED LINE

(75) Inventors: Albert D. Edgar, Austin, TX (US); Steven C. Penn, Georgetown, TX (US)

(73) Assignee: Applied Science Fiction, Inc., Austin, TX (US)

( * ) Notice: Subject to any disclaimer, the term of this patent is extended or adjusted under 35 U.S.C. 154(b) by 0 days.

(21) Appl. No.: 09/237,706

(22) Filed: Jan. 26, 1999

Related U.S. Application Data (60) Provisional application No. 60/073,602, filed on Feb. 4, 1998.

(51) Int. Cl.[7] .................................................. H04M 1/46
(52) U.S. Cl. ........................................ 358/514; 382/318
(58) Field of Search ................................ 358/513, 512, 358/514, 530, 474; 250/330, 208.1, 341.8; 382/191, 318, 275; 356/237.1, 237.2

(56) References Cited

U.S. PATENT DOCUMENTS

| | | | |
|---|---|---|---|
| 4,260,899 A | 4/1981 | Baker | 250/563 |
| 4,301,469 A | 11/1981 | Modeen et al. | 358/75 |
| 4,302,108 A | 11/1981 | Timson | 356/359 |
| 4,462,860 A | 7/1984 | Szmanda | 156/626 |
| 4,670,779 A | 6/1987 | Nagano | 358/75 |
| 4,677,465 A | 6/1987 | Alkofer | 358/80 |

(List continued on next page.)

FOREIGN PATENT DOCUMENTS

| | | | | |
|---|---|---|---|---|
| DE | 28 21 868 A1 | 11/1979 | ......... | G01N/21/32 |
| DE | 196 86 867 C1 | 1/1998 | ......... | H04N/5/21 |
| EP | 1 547 811 | 6/1979 | ......... | H04N/3/36 |
| EP | 0 422 220 A1 | 4/1991 | ......... | A61B/6/03 |
| EP | 0 482 790 B1 | 4/1992 | ......... | H04N/1/40 |
| EP | 0 527 097 A2 | 2/1993 | ......... | H04N/1/40 |

(List continued on next page.)

OTHER PUBLICATIONS

*New Adaptive Vector Filter Based on Noise Estimate*, Mei Yu, et al., IEICE Trans Fundamentals, vol. E82, No. 6, Jun., 1999.

*A Robust Method for Parameter Estimation of Signal–Dependent Noise Models in Digital Images*, B. Aiazzi, et al., IEEE, 1997, pp. DSP 97—601–604.

*A Regularized Iterative Image Restoration Algorithm*, Aggelos K. Katsaggelos, et al., IEEE, 1991, pp. 914–929.

*Adaptive Fourier Threshold Filtering: A Method to Reduce Noise and Incoherent Artifacts in High Resolution Cardiac Images*, M. Doyle, et al., 8306 Magnetic Resonance in Medicine, May 31, 1994, No. 5, Baltimore, MD., pp. 546–550.

(List continued on next page.)

Primary Examiner—Jerome Grant, II
Assistant Examiner—Negussie Worku
(74) Attorney, Agent, or Firm—Dinsmore & Shohl LLP (57) ABSTRACT

Surface defect correction technology for photographic images requires an infrared scan along with a conventional color scan. In the present invention, the additional infrared scan needed for surface defect correction is obtained by adding a line of sensors specific to infrared light to a conventional multilinear color sensor array. The invention teaches a practical mode of distinguishing infrared light using a dichroic prism placed over the sensor. This mode has the additional advantage of placing the infrared-specific sensor line in a displaced focus plane to match conventional lenses. Adding a sensor line to a conventional trilinear sensor array requires a quadrilinear array topology. In addition to the direct quadrilinear topology, the invention teaches a method of obtaining full color image information with only two linear sensor lines by interstitially mixing red and blue sensors on a single sensor line, which, in conjunction with the additional infrared line, results in a conventional trilinear sensor topology with a different filter arrangement.

20 Claims, 6 Drawing Sheets

U.S. PATENT DOCUMENTS

| | | | |
|---|---|---|---|
| 4,680,638 A | 7/1987 | Childs | 358/214 |
| 4,700,229 A | 10/1987 | Herrmann et al. | 358/166 |
| 4,775,238 A | 10/1988 | Weber | 356/431 |
| 4,796,061 A | 1/1989 | Ikeda et al. | 355/73 |
| 4,845,551 A | 7/1989 | Matsumoto | 358/80 |
| 4,933,566 A | 6/1990 | Masaaki et al. | 250/563 |
| 4,937,720 A | 6/1990 | Kirchberg | 363/41 |
| 4,969,045 A | 11/1990 | Haruki et al. | 358/228 |
| 4,972,091 A | 11/1990 | Cielo et al. | 250/562 |
| 4,989,973 A | 2/1991 | Noso et al. | 356/239 |
| 4,994,918 A | 2/1991 | Lingemann | 358/214 |
| 5,003,379 A | 3/1991 | Moore, Jr. et al. | 358/54 |
| 5,010,401 A | 4/1991 | Murakami et al. | 358/136 |
| 5,047,968 A | 9/1991 | Carrington et al. | 364/574 |
| 5,058,982 A | 10/1991 | Katzir | 385/33 |
| 5,091,972 A | 2/1992 | Kwon et al. | 382/54 |
| 5,097,521 A | 3/1992 | Massmann | 382/54 |
| 5,149,960 A | 9/1992 | Dunne et al. | 250/226 |
| 5,155,596 A | 10/1992 | Kurtz et al. | 358/214 |
| 5,200,817 A | 4/1993 | Birnbaum | 358/80 |
| 5,266,805 A * | 11/1993 | Edgar | 250/330 |
| 5,267,030 A | 11/1993 | Giorgianni et al. | 358/527 |
| 5,291,286 A | 3/1994 | Murakami et al. | 348/469 |
| 5,311,310 A | 5/1994 | Jozawa et al. | 348/416 |
| 5,335,086 A | 8/1994 | Kitamura | 358/431 |
| 5,371,542 A | 12/1994 | Pauli et al. | 348/262 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 385/500 |
| 5,465,163 A | 11/1995 | Yoshihara et al. | 358/444 |
| 5,477,345 A | 12/1995 | Tse | 358/500 |
| 5,509,086 A | 4/1996 | Edgar et al. | 382/167 |
| 5,516,608 A | 5/1996 | Hobbs et al. | 430/30 |
| 5,552,904 A | 9/1996 | Ryoo et al. | 358/518 |
| 5,561,611 A | 10/1996 | Avinash | 364/553 |
| 5,565,931 A | 10/1996 | Girod | 348/675 |
| 5,568,270 A | 10/1996 | Endo | 358/298 |
| 5,581,376 A | 12/1996 | Harrington | 358/518 |
| 5,582,961 A | 12/1996 | Giorgianni et al. | 430/508 |
| 5,583,950 A | 12/1996 | Prokoski | 382/212 |
| 5,589,887 A | 12/1996 | Wischermann | 348/616 |
| 5,608,547 A | 3/1997 | Nakatani et al. | 358/505 |
| 5,641,596 A | 6/1997 | Gray et al. | 430/21 |
| 5,666,443 A | 9/1997 | Kumashiro | 382/266 |
| 5,673,336 A | 9/1997 | Edgar et al. | 382/167 |
| 5,721,624 A | 2/1998 | Kumashiro et al. | 358/450 |
| 5,726,773 A | 3/1998 | Mehlo et al. | 358/474 |
| 5,729,631 A | 3/1998 | Wober et al. | 382/232 |
| 5,771,107 A | 6/1998 | Fujimoto et al. | 358/464 |
| 5,801,373 A * | 9/1998 | Oozu | 250/208.1 |
| 5,808,674 A | 9/1998 | Adams, Jr. et al. | 348/273 |
| 5,892,595 A | 4/1999 | Yamakawa et al. | 358/530 |
| 5,923,042 A | 7/1999 | Mietta et al. | 250/559.06 |
| 5,930,388 A | 7/1999 | Murakami et al. | 382/167 |
| 5,963,662 A | 10/1999 | Vachtsevanos et al. | 382/150 |
| 5,969,372 A | 10/1999 | Stavely et al. | 250/559.42 |
| 5,979,011 A | 11/1999 | Miyawaki et al. | 15/308 |
| 5,982,941 A | 11/1999 | Loveridge et al. | 382/260 |
| 5,982,951 A | 11/1999 | Katayama et al. | 382/284 |
| 5,991,444 A | 11/1999 | Burt et al. | 382/232 |
| 6,005,987 A | 12/1999 | Nakamura et al. | 382/294 |
| 6,057,040 A | 5/2000 | Hage | 428/447 |
| 6,075,905 A | 6/2000 | Herman et al. | 382/284 |
| 6,078,051 A | 6/2000 | Banton et al. | 250/341.1 |
| 6,078,701 A | 6/2000 | Hsu et al. | 382/294 |
| 6,094,281 A * | 7/2000 | Nakai | 358/512 |
| 6,101,273 A | 8/2000 | Matama | 382/169 |
| 6,128,416 A | 10/2000 | Oura | 382/284 |
| 6,239,886 B1 | 5/2001 | Klasser et al. | 358/518 |

FOREIGN PATENT DOCUMENTS

| | | | |
|---|---|---|---|
| EP | 0 569 142 A1 | 11/1993 | H04N/5/253 |
| EP | 0 624 848 A2 | 11/1994 | G06F/15/68 |
| EP | 0 699 753 A2 | 8/1995 | H04N/1/407 |
| EP | 0 716 538 | 6/1996 | 1/50 |
| EP | 0 716 538 A2 | 6/1996 | H04N/1/50 |
| EP | 0 751 670 A2 | 1/1997 | H04N/1/10 |
| EP | 0 768 621 A2 | 4/1997 | G06T/5/20 |
| EP | 0 794 454 A2 | 9/1997 | G03B/27/73 |
| EP | 0 816 833 A2 | 1/1998 | G01N/21/88 |
| EP | 0 816 833 A3 | 8/1998 | G01N/21/88 |
| EP | 0 893 914 A2 | 1/1999 | H04N/5/253 |
| GB | 2 283 633 A | 5/1995 | H04N/5/262 |
| JP | 4-291139 | 10/1992 | G01N/21/89 |
| JP | 11185028 | 7/1999 | G06T/1/00 |
| JP | 2000-13604 | 1/2000 | H04N/1/409 |
| JP | 2000-196813 A | 7/2000 | H04N/1/14 |
| WO | WO 84/02019 | 5/1984 | G06F/15/20 |
| WO | WO 89/06890 | 7/1989 | H04N/3/36 |
| WO | WO 90/01240 | 2/1990 | H04N/1/40 |
| WO | WO 91/09493 | 6/1991 | H04N/5/127 |
| WO | WO 92/05469 | 4/1992 | G03B/27/53 |
| WO | WO 95/15530 | 6/1995 | G06F/17/14 |
| WO | WO 97/16028 | 5/1997 | H04N/7/30 |
| WO | WO 98/31142 | 7/1998 | H04N/5/253 |
| WO | WO 98/34397 | 8/1998 | |
| WO | WO 99/40729 | 8/1999 | H04N/9/11 |
| WO | WO 01/48694 | 7/2001 | G06T/5/00 |

OTHER PUBLICATIONS

*Anisotropic Spectral Magnitude Estimation Filters for Noise Reduction and Image Enhancement,* Til Aach, et al., IEEE, 1996, pp. 335–338.

*Adaptive–neighborhood filtering of images corrupted by signal–dependent noise,* Rangaraj M. Rangayyan et al., Applied Optics, vol. 37, No. 20, Jul. 10, 1998, pp. 4477–4487.

*Grayscale Characteristics,* Photographic Negatives The Nature of Color Images, pp. 163–168.

*Digital Imaging Equipment White Papers,* Putting Damaged Film on Ice, A Technical Discussion of Advances in Digital Imaging, Nikon Corporation, http://www.nikonusa.com/reference/whitepapers/imaging/ditechdisc.html, Aug. 5, 1999.

*Local Cosine Transform—A Method for the Reduction of the Blocking Effect in JPEG,* Gil Aharoni, et al., Journal of Mathematical Imaging and Vision, 3, 7–38, 1993.

*Digital ICE,* Applied Science Fiction, Inc., http://www.asf.com/html/o_products/iceprod.html. Aug. 5, 1999.

*About Digital ICE Technology,* Applied Science Fiction, Inc., http://www.asf.com/html/o_products/icetech,html. Aug. 5, 1999.

*2–D Adaptive Volterra Filter for 2–D Nonlinear Channel Equalisation and Image Restoration,* J.N. Lin, et al., Electronic Letters, vol. 28, No. 2, Jan. 16, 1992, pp. 180–182.

* cited by examiner

MULTILINEAR ARRAY SENSOR WITH AN INFRARED LINE

RELATED APPLICATION

This application relies on U.S. Provisional Application Serial No. 60/073,602, filed Feb. 4, 1998, and entitled "Multilinear Array Sensor With An Infrared Line."

TECHNICAL FIELD OF THE INVENTION

This invention relates to the scanning of photographic images, and more particularly in a primary application, to scanning in infrared and visible light in order to prepare for correction of surface defects.

BACKGROUND OF THE INVENTION

Figure 1:
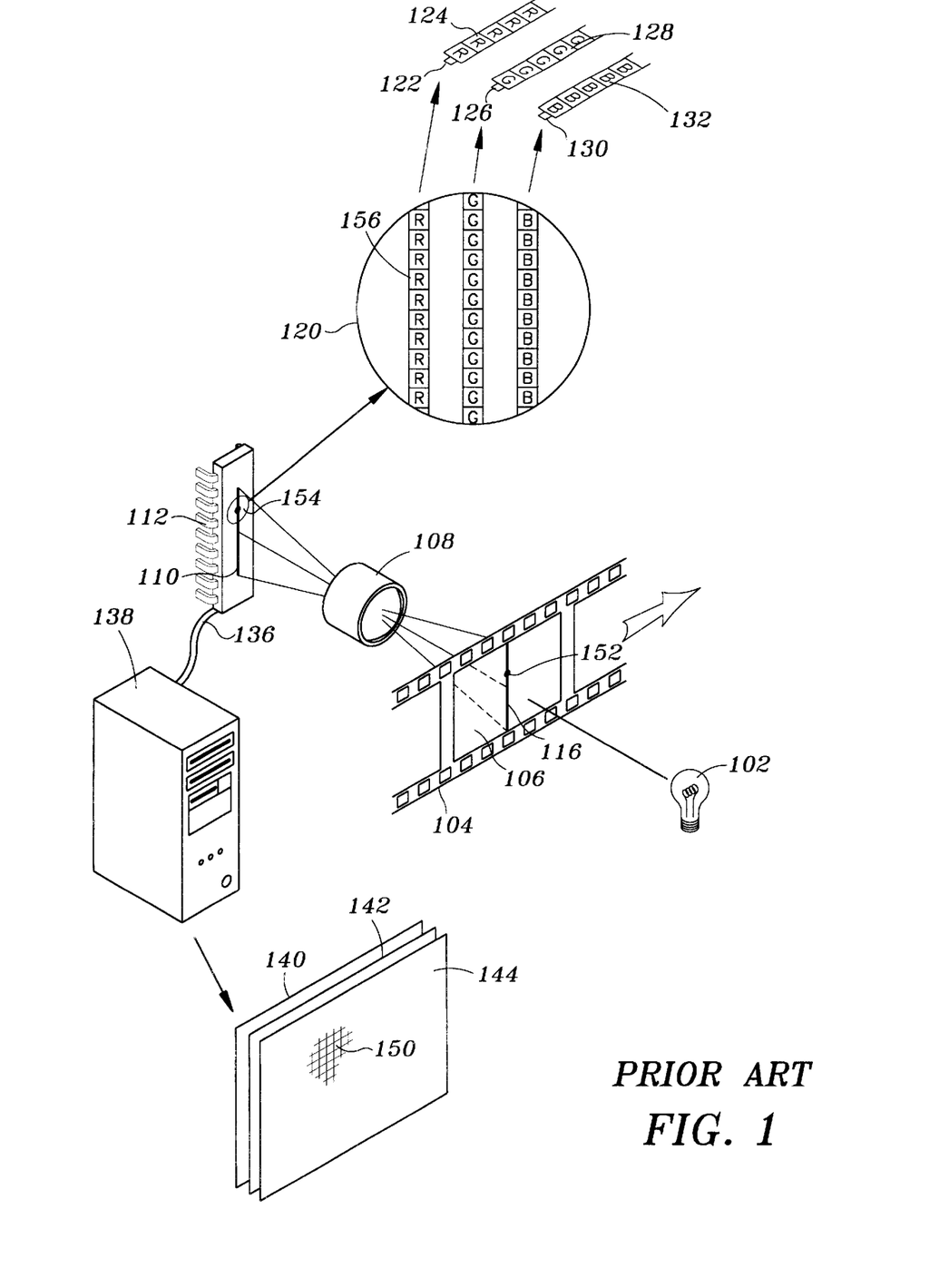
FIG. 1 shows a conventional trilinear film scanner.

FIG. 1 shows a prior art trilinear film scanner, and also introduces some terms that will be used in this application. A lamp 102 transilluminates a filmstrip 104 containing an image 106 to be scanned. Normally the light from the lamp 102 would be diffused or directed by additional optics, not shown, positioned between the lamp 102 and film 104 in order to illuminate the image 106 more uniformly. The image 106 on the film 104 is focused by lens 108 onto a sensor line 110 in a circuit package 112. The sensor line 110 projects back through lens 108 as a line 116 across the image 106. This line 116 is composed of many individual points, or pixels. To scan the entire image 106, the film 104 is moved perpendicularly to the line 116 to scan a two dimensional area, such as image 106. Because the sensors of the sensor line 110 are positioned in lines, this arrangement is called a linear, or line, sensor.

The sensor line 110 may be of a form known in the art as a "trilinear", or three line, array. As shown magnified at 120, the sensor line 110 actually consists of three parallel lines of sensors. In this prior art embodiment, one line of sensors 122 is behind a line of red filters 124. This arrangement could consist of a series of independent filters, but is normally a single long red filter 124 which covers all of the sensors of line 122. Another line of sensors 126 is behind a green filter line 128, and a third line of sensors 130 is behind a blue filter line 132.

As the film 104 is moved, the three lines 122, 126, and 130 each provide an individual image of the film seen with a different color of light. The data from the circuit package 112 is sent along cable 136 to supporting electronics and computer storage and processing means, shown together as computer 138. Inside computer 138 the data for each color image is grouped together, and the three images are registered as the three color planes 140, 142, and 144 of a full color image. Each of these color planes 140, 142 and 144 consists of pixels describing with a number the intensity of the light at each point in the film. For example, pixel 150 of the red color plane 144 may contain the number "226" to indicate a near white light intensity at point 152 on the film 104, as measured at a specific sensor 154 in the array 110, shown enlarged in circle 120 as sensor 156 behind the red filter line.

Figure 2:
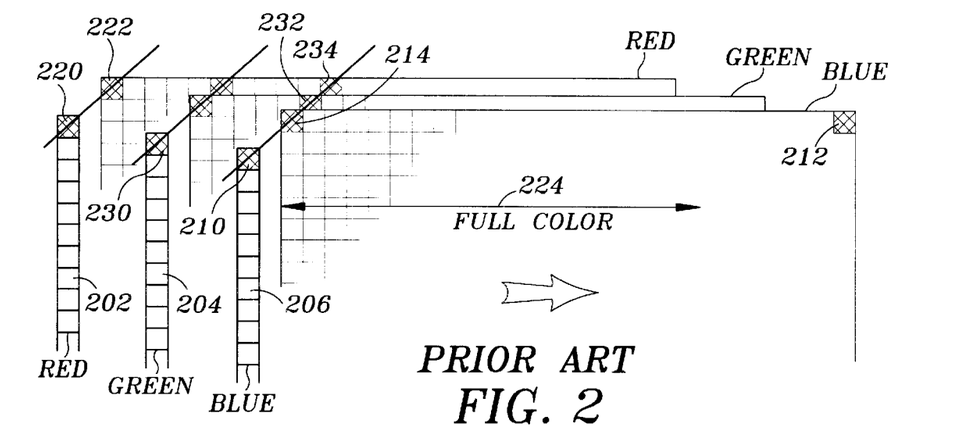
FIG. 2 illustrates registration of a multilinear array.

In FIG. 1 it is noted that there is a spacing between sensor lines 122, 126 and 130, and therefore the same point on the film 104 is not sensed by all three color lines at the same point in time. FIG. 2 illustrates this registration problem in more detail.

In FIG. 2 there is a trilinear array (not shown) with red, green, and blue sensor lines 202, 204, and 206. These lines are projected onto a substrate (not shown) which is moved in the direction of the arrow to scan out regions of the image on the substrate. The region seen by each line is different from the region seen by the other lines. For example, at the beginning of an arbitrary time interval, sensor 210 of the blue line 206 may see point 212 of the substrate, while at the end of the time interval, it may see point 214. It is apparent that each of the different sensors 210, 220 and 230 sees a different area during the same time interval. For example, at the end of the time interval, sensor 220 of the red sensor array 202 sees point 222, which is different than point 214 seen by the blue sensor 210 at the same end time. However, if the time interval is long enough, there will exist a region of overlap 224 over which all array lines have passed. If the interval between measurements is an integer submultiple of the spacing between the arrays, then there exists a time at which sensor 230 of the green line 204 sees the same point 232 on the substrate as 214, and another time at which sensor 220 of the red line 202 sees point 234, the same as point 214, which in turn will be seen by the blue sensor 210 at a later time. The computer system 138 receiving the information from the scans made by the trilinear array registers the data representing the three color images by shifting the data an amount corresponding to the distance between sensor lines, and discarding the part of each color record outside the full color range overlap 224.

Although this illustration has presented a so-called transmission, or film, scanner, a reflection, or print, scanner uses the same principles except that the source light is reflected from the same side as the imaging lens. As is explained later, there are uses for the present invention in both transmission and reflection scanners.

The conventional scanners described above scan in the three visible colors, exclusive of the invisible infrared. There are several reasons that it would be useful to add an infrared record registered to the conventional colored records. For example, examination of old documents under infrared with a reflection scanner is proving useful in examination of historic works, such as the Dead Sea Scrolls, to disclose alterations. Another potential use presented here without admission that it is known in the art, is to distinguish the "K" or black channel from the cyan, magenta, and yellow channels in a four color print. Currently a major commercial use of infrared plus visible scans is a technology called infrared surface defect correction, as explained in FIG. 3. Current applications of infrared surface defect correction are limited to transmission scanners, although it may be extended to reflection scanners, and therefore the specific illustration of a transmission scanner given below is not to be considered a limitation.

Figure 3:
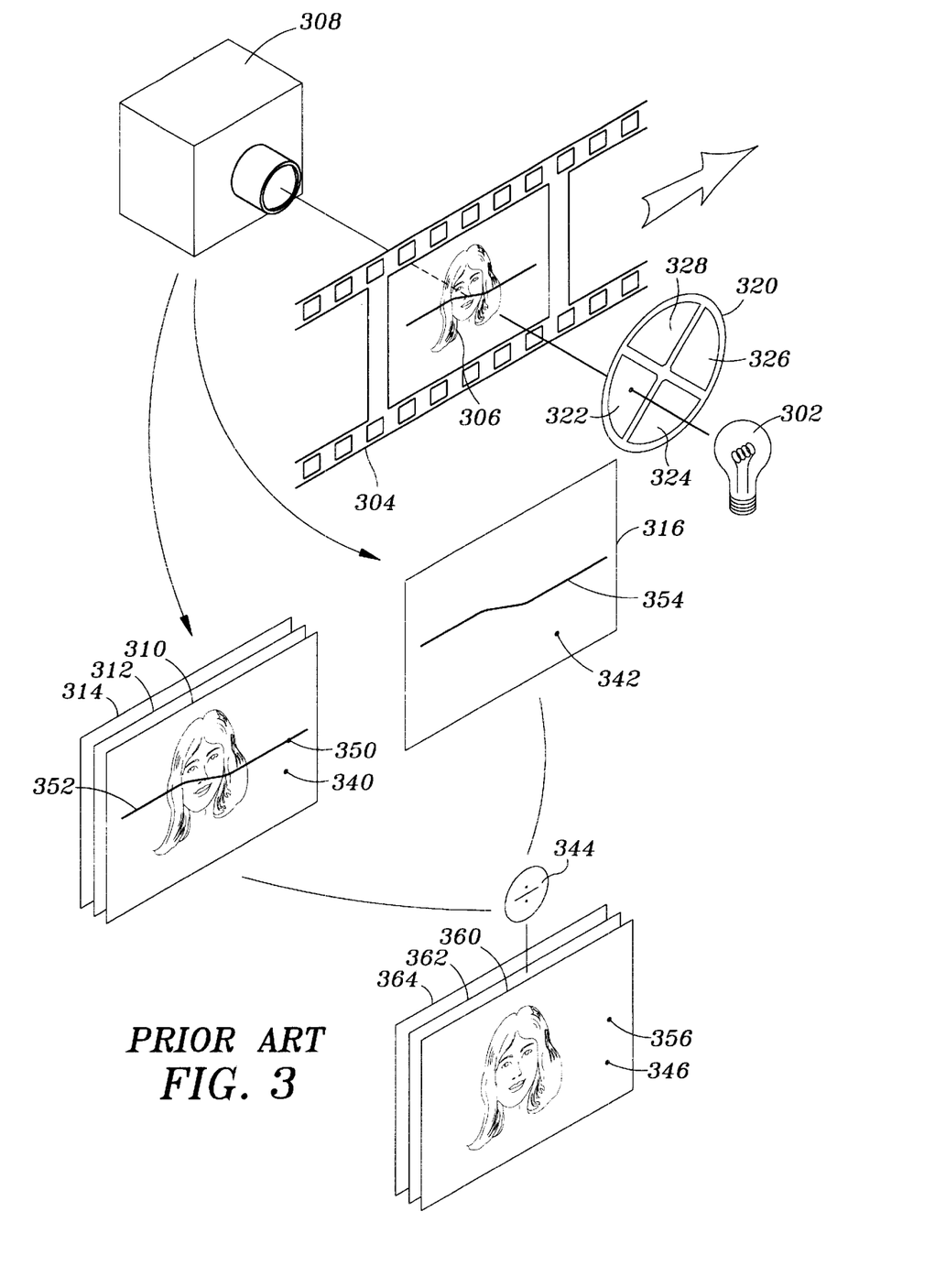
FIG. 3 explains the operation of infrared surface defect correction.

In FIG. 3, a lamp 302 transilluminates filmstrip 304 containing an image 306. An electronic camera 308 views the image 306 and outputs red, green, and blue digitized records 310, 312, and 314. In addition the electronic camera 308 outputs an infrared record 316. There are several ways a conventional camera can be made responsive to selectively visible and infrared light. One way is to provide a filter wheel 320 with four filters: red 322, green 324, blue 326, and infrared 328. If the camera 308 is a monochrome camera whose sensitivity extends into infrared, then the three visible colors and infrared may be captured at four different times, each time illuminating the film with a different filter in the filter wheel 320.

The cyan, magenta, and yellow dyes that create the image 306 are all transparent to infrared light, and therefore the film 304 appears clear to camera 308 when viewed under infrared light. On the other hand, surface defects such as dust, scratches, and fingerprints refract the light passing through the film 304 away from the camera 308, and therefore appear as darkened points under both visible and infrared light. Because refraction under infrared light is nearly equal to refraction under visible light, the defects appear nearly as dark in the infrared as in the visible spectrum.

Therefore infrared record 316 is effectively of a clear piece of film including defects, and image 310 contains the same defects plus the red image. The infrared image 316 provides a pixel by pixel "norming" for the effect of defects. For example, defect-free pixel 340 in the red record 310 may contain a 50% brightness measurement. The corresponding defect-free pixel 342 in the infrared record 316 contains 100% brightness because no defect has attenuated the light. Function block 344 divides the 50% brightness level from the red record 310 by the norming 100% brightness level from the infrared record 316 to give a 50% brightness measurement for corrected pixel 346. On the other hand, pixel 350 under scratch 352 in the red record 310 may contain a 40% brightness measurement. The corresponding pixel 354 in the infrared record 316 seeing the same scratch may contain 80% brightness because the scratch has refracted 20% of the light. When function block 344 divides 40% by 80%, a corrected brightness value of 50% is determined for pixel 356. Note that corrected pixels 346 and 356 within the same background area of the image now both contain the same brightness value of 50%, so the effect of the scratch has disappeared. This division is repeated for each pixel to produce the corrected red record 360; and the same division by infrared is applied to the green record 312, and blue record 314, to produce the corrected green and blue records 362 and 364, resulting in a full color corrected image.

There are several ways of generating an infrared scan in conjunction with a visible scan. One method makes four passes across the original image using a light that changes color between passes, as was shown in FIG. 3. Unfortunately, this can take four times as long as a single pass scanner. Alternately, one can make a single pass while flashing four lights in rapid succession, but again the hardware may need to move at one fourth the speed. None of these prior art methods combines the speed obtained with a single pass multilinear array with the image clarity possible in the prior art attained by making multiple scans. It is apparent that the introduction of such a system would provide an improvement to the state of the art in infrared surface defect correction, as well as to the other uses of combined infrared and visible scans mentioned above.

SUMMARY OF THE INVENTION

The present invention adds a line to a conventional multilinear sensor array. The added line is specific to the infrared scan. In the most direct embodiment, the added line makes what was a trilinear array containing three lines, one for each of three primary colors, into a quadrilinear array. In a second embodiment, the red and blue sensor lines are combined into one line that alternates between red and blue sensors. This second embodiment uses only two lines for sensing full color, allowing the third line of existing trilinear layouts to be devoted to infrared.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 4:
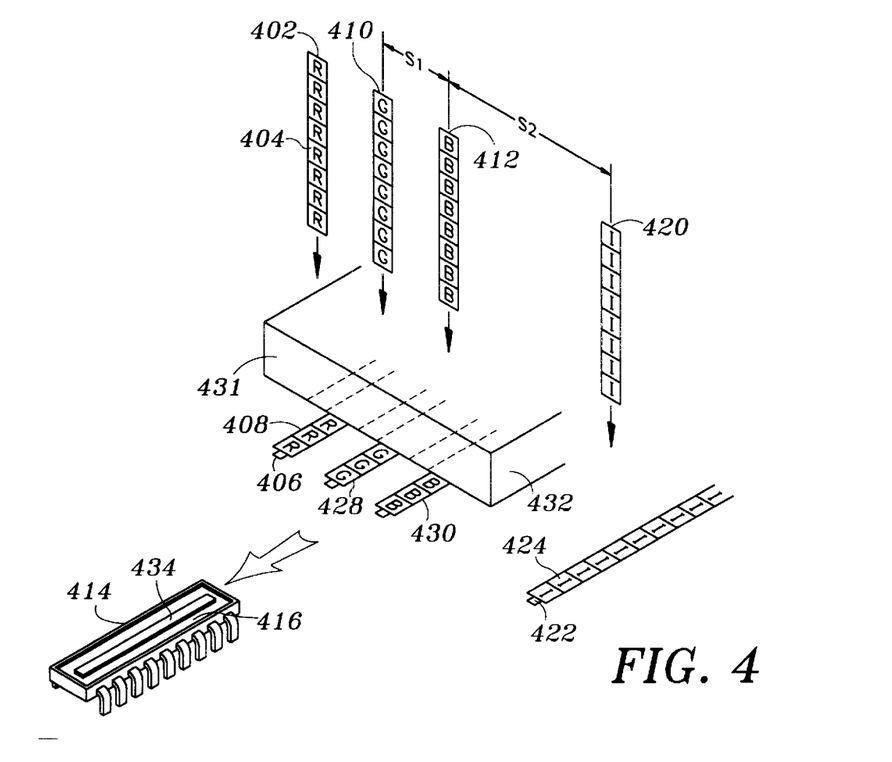
FIG. 4 shows the present invention with a quadrilinear line and infrared filter.

FIG. 4 shows a prior art trilinear array with the addition of the novel fourth sensor line for infrared scanning. In this figure, sensor line 402 contains individual photosites 404, each behind a red filter. In perspective, it is seen that the line 402 consists of a row of silicon photosensor sites 406 behind red filter material 408 to render the row of photosites 406 responsive primarily to red light. Similarly, the photosites in sensor lines 410 and 412 are made primarily responsive to green and blue light, respectively. Together these three lines 402, 410 and 412, in conjunction with their overlaid filters, form a prior art trilinear sensor array. These three silicon lines with their overlaid filters are typically contained in a package 414 under cover glass 416.

The present invention teaches the addition of another line 420 to the device which is specific to infrared light. Silicon sensor material is inherently sensitive to the lower end of the infrared spectrum, so the layout and construction of the extra sensor line 420, shown in perspective as line 424 having photosites 422, may be a copy of one of the other three lines, such as line 428 or 430. The manufacture of a silicon sensor line, and the duplication of multiple copies of a silicon circuit, called "macros" onto a silicon die, are well known in the art.

Line 420 is made primarily responsive to infrared light by removing visible light reaching the photosensor sites 422 with a line of infrared-passing, visible-absorbing filter material 424. Infrared filter material 424 would appear black to the human eye. A number of such infrared materials are known in the art. As an example, a double layer filter, the first layer consisting of the filter material 408 printed to make the red line 402, overlaid with a second layer consisting of the filter material printed to make the green line 428, would together absorb visible light and transmit infrared. In fact, any two or three of the visible colors combined would absorb visible and pass infrared light. Because these filter materials are already present in the printing of the other two lines, this method would enable manufacture of the infrared filter 424 without requiring any additional dye types in the fabrication process.

Figure 5:
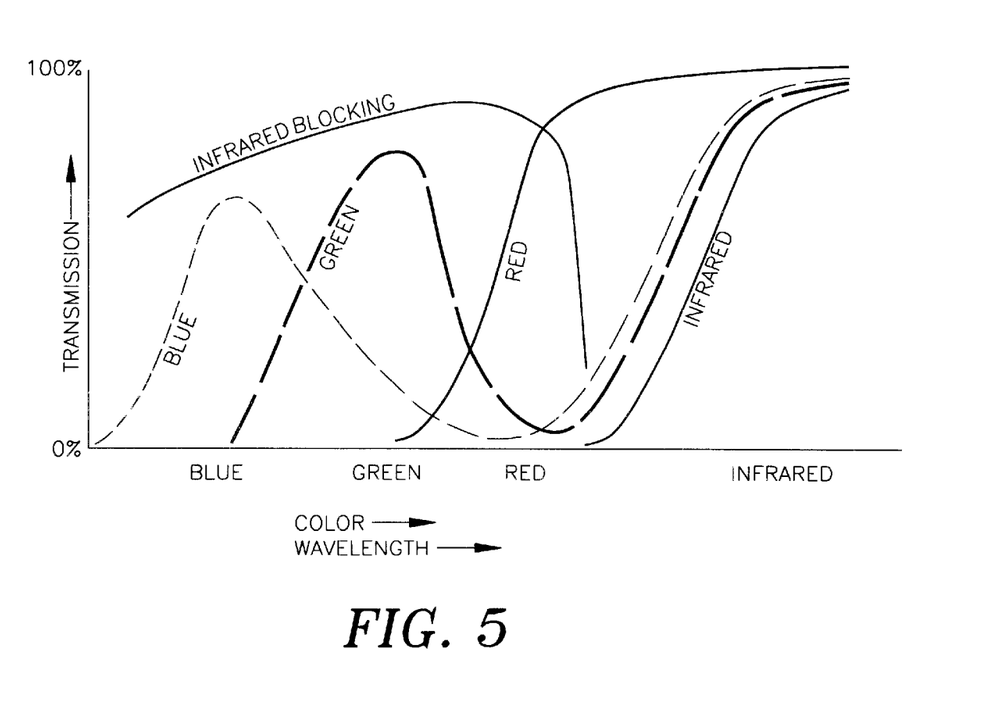
FIG. 5 graphs the color transmission of available filters.

Unfortunately, a problem arises when using the device described thus far. This problem is explained using FIG. 5 wherein the transmission of typical organic colored dyes commonly used to form the colored filter lines of FIG. 4 are graphed. Although the infrared line is rendered primarily responsive to only infrared light by the infrared filter, the other colors are specific not only to their labeled visible color, but to infrared light as well, as is seen by observing that the labeled color graphs in FIG. 5 transmit infrared light. When a scan is made in which each of the visible records also contains infrared light, a faded and excessively surface-defect-sensitive image results. Therefore, in the prior art, either a light source was used that had no infrared content, or an infrared blocking filter was placed somewhere in the light path, such as at the light source itself or as a component of the cover glass in the sensor circuit package.

In the present invention, in order to overcome this problem and sense infrared in one sensor line, infrared light cannot be blocked before reaching the sensor package. Therefore, the infrared blocking filter must be combined with the visible filters at the sensors. In one embodiment of the present invention, the visible color filters of lines 408, 428, and 430 of FIG. 4 are manufactured with a process that absorbs or reflects infrared light. Such a process may use multiplayer interference filters commonly known in the art. These filters require many layers, and in order to produce three colors on the same substrate, the substrate would need to be deposited many times resulting in difficult and expensive manufacturing. As depicted in FIG. 4, noninfrared (which includes visible light) and infrared light are simultaneously substantially blocked as the noninfrared and infrared light pass through the filters to their respective sensors.

As an improved embodiment, FIG. 4 teaches the use of a cut piece of infrared blocking material 431 laid over the three visible lines 408, 428, and 430, but having a terminating edge 432 between the last visible color sensor line 430 and the infrared line 424. This blocking material 431, shown also as filter 434 in circuit package 414, could be placed on top of the cover glass 416, manufactured as part of the cover glass, or ideally placed under the cover glass and directly over the sensor lines.

An infrared absorbing filter, such as is available from Schott Optical of Germany, typically is relatively much thicker than the organic colored filters, and therefore creates a shadowing parallax problem at the edge 432 over sensor lines that are very close. This shadowing may be minimized by moving the thick filter closer to the sensor lines when placing it under the cover glass 416, and is also made less objectionable by moving the infrared sensor line 424 further from the last visible line 430. In the arrangement of FIG. 4, the spacing S2 between the visible and infrared lines is made greater than the spacing S1 between the visible lines. In particular, for maximum step resolution flexibility, the ratio S2/S1 should be an integer. In the specific illustration of FIG. 4, the ratio of S2/S1 is two.

Figure 6:
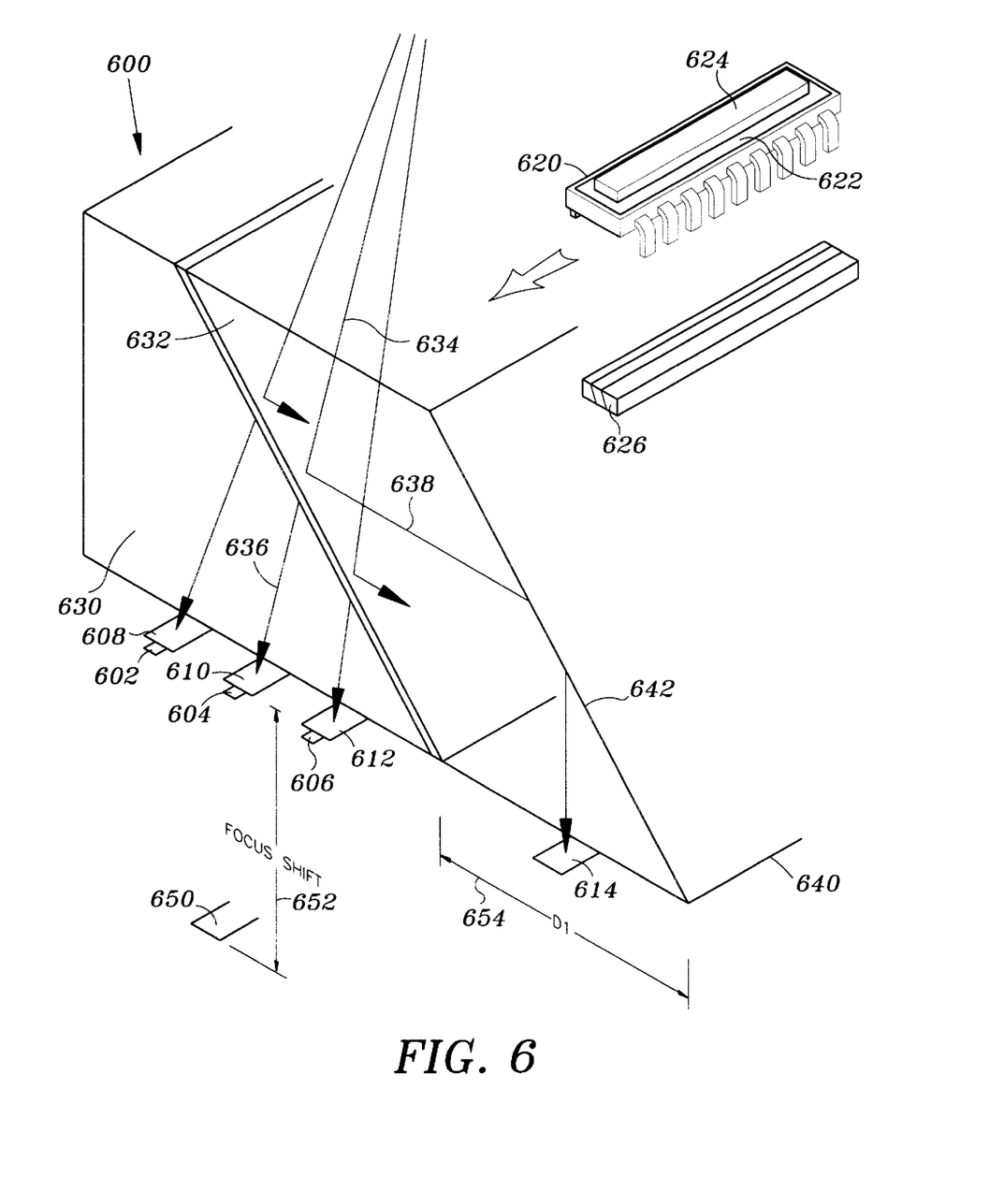
FIG. 6 shows the preferred embodiment with a dichroic prism.

A preferred embodiment of the present invention which uses a prism to separate visible from infrared light is shown in FIG. 6. This embodiment has the added advantage of shifting the infrared focus plane to correct for common chromatic aberrations caused by imaging lenses.

In FIG. 6 the three visible color sensor lines 602, 604, and 606 lie under red, green, and blue filter lines 608, 610, and 612, respectively, as previously illustrated in FIG. 4. Also novel infrared sensor line 614 is added to practice the present invention, but unlike FIG. 4, an infrared filter line over sensor line 614 is optional. All these lines are housed within circuit package 620 under a transparent cover glass 622. Also included is a dichroic prism 624 which may be mounted on the cover glass 622, incorporated as a part of the cover glass (shown separately at 626), or incorporated under the cover glass in contact with the sensor lines as illustrated in the enlarged illustration 600 of FIG. 6.

In the enlarged illustration 600, a first prism 630 has a surface 632 coated such that a light ray 634 is split into a transmitted visible component 636 and a reflected infrared component 638. Such a surface coating is commonly known in the art as a "hot mirror", because the heat, or infrared, component is reflected. Hot mirrors are available from Edmund Scientific Corporation of Barrington, N.J. Bonded to the first prism 630 is a second prism 640 constructed with parallel surfaces such that the reflected infrared component 638 is further reflected at surface 642 so as to be directed toward infrared sensor line 614. The reflection surface 642 is preferably coated so as to enhance reflection while preventing light incident from above the second prism 640 from penetrating to the sensor line 614. A coating material commonly used in mirrors for high infrared reflectivity is gold.

Figure 7:
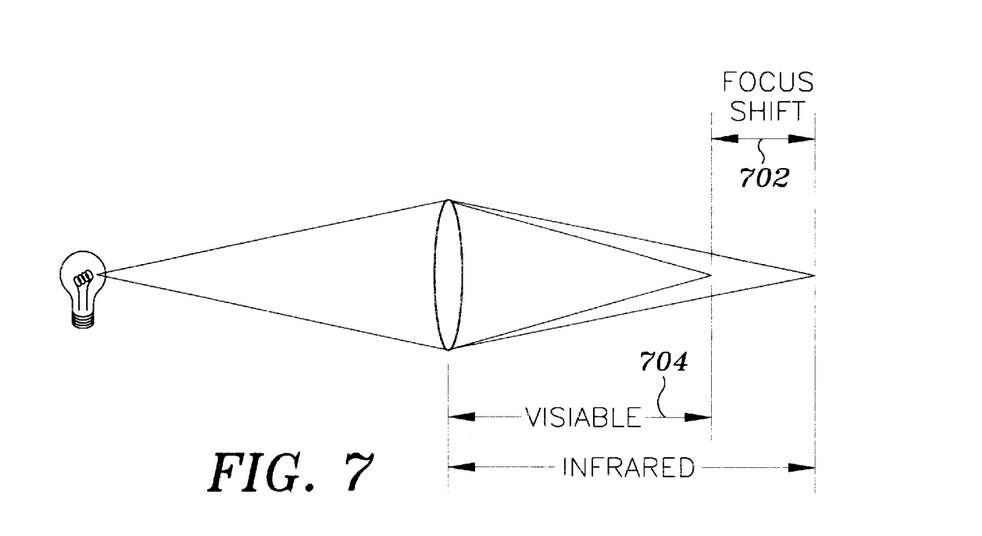
FIG. 7 illustrates the infrared focus shift common to imaging lenses.

The apparatus of FIG. 6 has a significant advantage over the apparatus of FIG. 4, as explained with reference to FIG. 7. In FIG. 7, it is noted that the focus plane for infrared light is displaced relative to the focus plane for visible light. The focus difference is shown greatly exaggerated in FIG. 7. In a typical achromatic lens, the focus shift 702 is about 0.25% of the visible focal length for infinity which would be about 0.5% of the combined visible focal distance 704 of the lens in FIG. 7 operating at a unity magnification. Returning to FIG. 6, it is noted that the virtual image 650 of the infrared line 614 is displaced by distance 652 below the visible sensor lines. Distance 652 is equal to D1 654 divided by the index of refraction to infrared light of prism section 640. The displacement distance D1 654 is defined by the characteristics of prism section 640, and is preferably chosen to be the distance between the infrared sensor line and the middle visible sensor line.

Note that the distance D1 654 is easily controlled at manufacture as a function of the thickness of prism section 640 and is not affected by misalignments in laying the prism over the sensor lines. Therefore, an otherwise high level of precision is not required in the cleanroom where the circuits are packaged. The displacement distance 652 also introduces a slight magnification of the infrared image which can be corrected through a resize algorithm, such as is commonly known in the art.

Although it is conceptually simple to duplicate a fourth silicon sensor line, in practice it is very expensive to make any change to an existing silicon fabrication process. In addition, more silicon is required for the extra line along with more electronics to support the extra data. Accordingly it would be an advantage if an existing trilinear line could be adapted to the present invention. Such an adaptation is shown in FIG. 8 which illustrates the application of the invention with other than a quadrilinear array.

Figure 8:
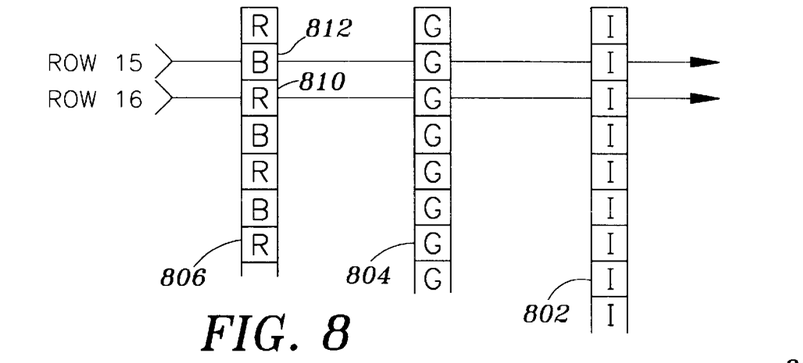
FIG. 8 charts the filter arrangement of a trilinear infrared sensor.

In FIG. 8, a conventional trilinear silicon sensor is adapted to practice the current invention by altering only the filters deposited over the silicon sensors, and not the silicon layout itself. To practice the invention, one of the sensor lines 802 is rendered specific to infrared scanning by one of the methods discussed above to substantially block noninfrared light. One such method, presented above, uses a prism with an infrared reflecting dichroic coating.

With one of the three sensor lines dedicated to infrared, only two sensor lines remain to receive three visible colors. One line 804 receives a primary color, chosen as green in the preferred embodiment. The last array 806 must therefore sense the remaining two colors. This can be done by alternating the remaining two colors interstitially at pixel boundaries, such as by making sensors receptive to red 810 in even rows such as row 16 and to blue 812 in odd rows such as row 15, as illustrated in FIG. 8.

The primary color may be green as presented above; however, in an embodiment more conservative of photons for use in low light, the primary color used for line 804 is chosen to be white, namely the visible light remaining after removal of infrared light with an infrared blocking filter, but with no auxiliary color filter. The two alternating colors in line 806 are then chosen as either cyan and orange or cyan and light red. Such a combination would approximately double the number of photons impinging on the silicon sensors after passing through the colored filters, and therefore the luminance noise would be less due to lowered shot noise. This lowering of luminance noise comes, however, at the expense of weaker color distinction, requiring color amplification and thereby causing increased color noise. In low light this has been found to be a practical trade-off.

Figure 9:
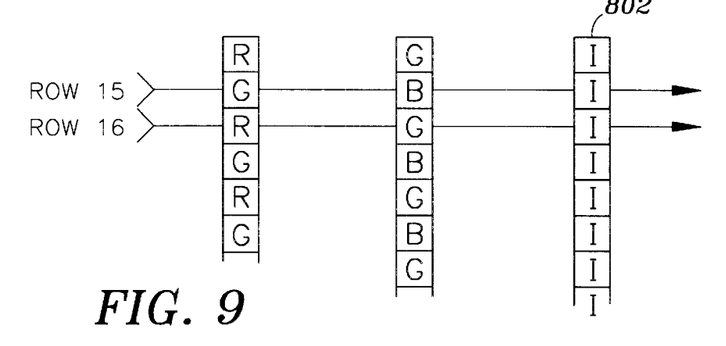
FIG. 9 charts the filter arrangement of an alternate trilinear infrared sensor.

The embodiment just described uses row 15 as an example of a row in which each point on a substrate, after scanning, has been sensed with infrared, green, and blue light, and row 16 as an example of a row in which each point on the substrate, after scanning, has been sensed with infrared, red, and green light. It does not matter significantly in what time order the colors are sensed. The color filter topology of FIG. 9 is seen to produce the same color combinations, and in particular rows 15 and 16 of FIG. 9 are seen to sense the same colors as lines 15 and 16 of FIG. 8, albeit at different times. In fact, the infrared sensors also could obviously be interspersed on the other lines in any of the embodiments illustrated in this application without departing from the scope of the invention. The embodiment shown in FIG. 9 is still considered to have a green selective line; the line has just been interspersed in other lines.

Figure 10:
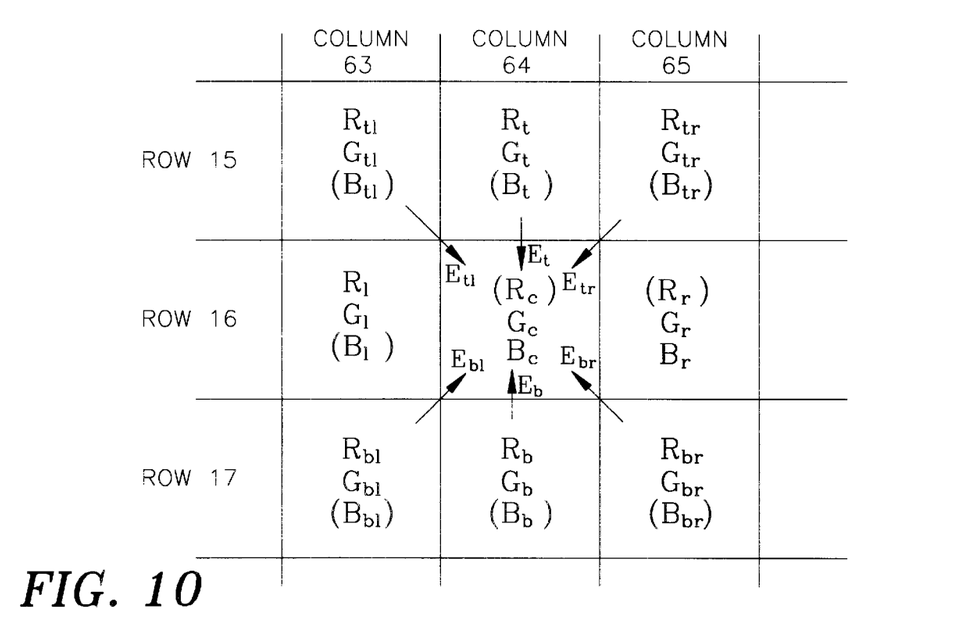
FIG. 10 presents missing color recovery used with the sensor shown in FIG. 7.

In the reproduction of an image made with the color topology taught in FIG. 8, it is necessary to recreate the missing color in each row. Turning to FIG. 10, the sensed colors are named for each pixel of each row, including rows 15 and 16 used in the above examples. The missing colors for each pixel of each row are named in parentheses. It is those colors that need to be estimated using available known color information. The specific color measurements are named using a nomenclature relative to the center pixel: "c" for center, "t" for top, "tr" for top right, "r" for right, "br" for bottom right, "b" for bottom, "bl" for bottom left, "l" for left, and "tl" for top left. In this example Rc, the unmeasured red value for the center pixel, will be estimated. Although this example will estimate the value for one red pixel, the same algorithm could apply to any red pixel within any even row, or the blue value on odd rows by interchanging red and blue wording.

The unmeasured value of Rc will be calculated by combining estimates based on color information from the surrounding pixels. These estimates are named as the six estimates Et, Etr, Ebr, Eb, Ebl, and Etl. In a preferred embodiment, the diagonal estimates contribute to the determination of the unmeasured value just as do the vertical estimates, but at a reduced strength, namely Rc=(Et+Eb)/4+ (Etl+Etr+Ebl+Ebr)/8. In another embodiment, more efficient of computer time, the diagonal estimates may be completely ignored, namely Rc=(Et+Eb)/2.

Next, calculation of the estimates using Et and Eb by name will be disclosed. Any of the other estimates Etl, Etr, Ebl, and Ebr may be similarly calculated with the change in nomenclature. Most basically, each estimate can be simply the red value of the adjacent pixel, namely Et=Rt and Eb=Rb. It is possible to improve the estimate by using the green value that is known for all pixels. In particular, it can be assumed, because the real world tends to be rather monochromic, that the red value changes with position about as fast as the green value changes. Therefore, a particular estimate, such as Et, will use not only the red value of the adjacent pixel, but will adjust this value by the amount green changes from the adjacent pixel to the center pixel for which red is being estimated.

For example, Et=Rt+(Gc−Gt) and Eb=Rb+(Gc−Gb) to use the linear change in color. Alternately Et=Rt*Gc/Gt and Eb=Rb*Gc/Gb to use the percent change in color. When the color measurements are directly proportional to lumens, the linear change is found to work better when Rt>Gt or Rb>Gb, and the percent change works better when Rt<Gt or Rb<Gb. The equations produce the same result when Rt=Gt or Rb=Gb. When the color measurements are expressed in the common gamma correct space wherein values are proportional to the square root of lumens, the linear change is found to be acceptable in all cases, but with the resultant values clamped so as not to go negative.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A system for scanning a substrate in visible and infrared light, the substrate including a plurality of parallel sensor lines, the system including:
    means for substantially blocking noninfrared light to a first sensor of the plurality of sensor lines; and
    means for simultaneously substantially blocking infrared light to a second sensor of the plurality of sensor lines.

2. The system of claim 1 wherein said infrared light blocking and noninfrared light blocking means comprise a prism.

3. The system of claim 2 wherein the prism includes a first surface having an interference filter to transmit noninfrared light and reflect infrared light.

4. The system of claim 3 wherein the prism further includes a second surface substantially parallel to the first surface which redirects the reflected infrared light to the first sensor line.

5. The system of claim 1 and further including means for substantially blocking infrared light to a third sensor line of the plurality of sensor lines, wherein the second sensor line is made primarily responsive to visible light of a first color, and the third sensor line is primarily responsive to visible light of a second color.

6. The system of claim 5 and further including:
    a first filter for passing light of the visible light of the first color, free of infrared light to the second sensor line, and a second filter for passing light of the visible light of the second color, free of infrared light to the third sensor line.

7. The system of claim 5 and further including:
    means for substantially blocking infrared light to a fourth sensor line of the plurality of sensor lines, wherein the fourth sensor line is primarily responsive to a visible light of a third color.

8. The system of claim 5 and further including:
    an infrared blocking filter for blocking infrared light to the second and third sensor lines, and a first filter for passing light of the visible light of the first color plus infrared light to the second sensor line, and a second filter for passing light of the visible light of the second color to the third sensor line.

9. The system of claim 8 wherein the infrared blocking filter reflects infrared light toward the first sensor line.

10. The system of claim 8 wherein the infrared blocking filter absorbs infrared light.

11. The system of claim 8 wherein the infrared blocking filter reflects infrared light.

12. The system of claim 5 wherein the third sensor line further comprises a plurality of individual sensors wherein a first individual sensor of the third sensor line is primarily responsive to a high color within the visible light of the second color, and a second individual sensor of the third sensor line is primarily responsive to a low color with the visible light of the second color.

13. The system of claim 12 wherein the color of the visible light of the second color is magenta, the high color is blue, and the low color is red.

14. The system of claim 13 wherein the color of the visible light of the first color is green.

15. The system of claim 12 wherein the color of the visible light of the first color is white.

16. The system of claim 15 wherein the high color is cyan.

17. The system of claim 12 wherein the low color corresponding to the position of the first individual sensor is estimated as a function of the low color measured by the second individual sensor, and the difference in the first color measured by respective individual sensors of the second sensor lines at positions corresponding to the first individual sensor and the second individual sensor.

18. A sensor responsive to visible light and infrared light, comprising:

a substrate, a first linear sensor disposed on said substrate and being pninarily responsive to visible light of a first color;

a second linear sensor disposed on said substrate and being primarily responsive to visible light of a second color;

a third linear sensor disposed on said substrate and being primarily responsive to visible light of a third color;

a fourth linear sensor disposed on said substrate and being primarily responsive to infrared light;

means for substantially blocking infrared light from said first, second, and third linear sensors; and means for simultaneously substantially blocking visible light from said forth linear sensor.

19. The sensor of claim 18 wherein said linear sensors are spaced apart by a distance, such that the distance between said first and second sensors and the distance between said second and third sensors is less than the distance between said third and fourth sensors.

20. The sensor of claim 18 wherein said blocking means includes a prism.

* * * * *